(12) United States Patent
Adam et al.

(10) Patent No.: US 10,343,730 B2
(45) Date of Patent: Jul. 9, 2019

(54) ADJUSTABLE BUNK AND VEHICLE EQUIPPED WITH THE SAME

(71) Applicant: VOLVO TRUCK CORPORATION, Göteborg (SE)

(72) Inventors: Bruno Adam, Lyons (FR); Thibault Picardel-Vaillier, Polliat (FR); Laure Verger, Serpaize (FR)

(73) Assignee: Volvo Truck Corporation, Göteborg (SE)

( * ) Notice: Subject to any disclaimer, the term of this patent is extended or adjusted under 35 U.S.C. 154(b) by 148 days.

(21) Appl. No.: 15/536,029

(22) PCT Filed: Dec. 17, 2014

(86) PCT No.: PCT/IB2014/003108
§ 371 (c)(1),
(2) Date: Jun. 14, 2017

(87) PCT Pub. No.: WO2016/097788
PCT Pub. Date: Jun. 23, 2016

(65) Prior Publication Data
US 2017/0341688 A1   Nov. 30, 2017

(51) Int. Cl.
*B62D 33/06* (2006.01)
*B62D 33/063* (2006.01)

(52) U.S. Cl.
CPC ....... *B62D 33/063* (2013.01); *B62D 33/0612* (2013.01)

(58) Field of Classification Search
CPC ... B62D 33/0612; B62D 33/06; B62D 33/063

USPC ................ 296/190.02, 173, 65.01
See application file for complete search history.

(56) References Cited

U.S. PATENT DOCUMENTS

| | | | |
|---|---|---|---|
| 4,989,281 A | 2/1991 | Christensen | |
| 5,984,404 A * | 11/1999 | Novoa | A47C 17/84 296/190.01 |
| 6,209,943 B1 * | 4/2001 | Neale | B60N 2/3015 296/65.01 |
| 6,735,797 B1 | 5/2004 | Long et al. | |
| 7,150,471 B2 * | 12/2006 | Langhoff | B60R 21/02 280/749 |

(Continued)

FOREIGN PATENT DOCUMENTS

| | | |
|---|---|---|
| CN | 2066407 U | 11/1990 |
| EP | 0987140 A2 | 3/2000 |
| WO | 9841419 A1 | 9/1998 |

OTHER PUBLICATIONS

International Search Report (Jun. 24, 2015) for corresponding International App.PCT/IB2014/003108.

(Continued)

*Primary Examiner* — Pinel E Romain
(74) *Attorney, Agent, or Firm* — WRB-IP LLP

(57) ABSTRACT

An adjustable bunk is adapted for trucks or other vehicles equipped with a sleeping compartment. The bunk has a front end and a foot extremity and includes at least a first segment, pivotally connected to a second segment, by a supple connection, wherein the first segment may be in a horizontal position or in a non-horizontal position, while the second segment remains in a horizontal position. The first segment of the bunk is suspendable on an upper support placed above the bunk.

19 Claims, 5 Drawing Sheets

(56) References Cited

U.S. PATENT DOCUMENTS

| | | | | |
|---|---|---|---|---|
| 7,618,076 | B2* | 11/2009 | Meynet | B60N 2/0232 |
| | | | | 296/65.01 |
| 7,686,367 | B2* | 3/2010 | Neale | B60N 2/06 |
| | | | | 296/64 |
| 8,186,744 | B1* | 5/2012 | Hanser | B60P 3/39 |
| | | | | 296/170 |
| 8,771,645 | B2* | 7/2014 | Cordeiro | A61K 49/0004 |
| | | | | 424/9.6 |
| 2008/0284214 | A1 | 11/2008 | Neale | |
| 2009/0295208 | A1* | 12/2009 | Elhanati | B60N 2/24 |
| | | | | 297/273 |
| 2017/0354560 | A1* | 12/2017 | Brulotte | A61G 7/1015 |

OTHER PUBLICATIONS

Chinese Official Action (Jul. 20, 2018) for corresponding Chinese App. 201480004106.2.

* cited by examiner

ADJUSTABLE BUNK AND VEHICLE EQUIPPED WITH THE SAME

BACKGROUND AND SUMMARY

The present invention relates to an adjustable bunk. In particular, the present invention is directed to a bunk that provides modularity and easiness of use and therefore, it is particularly adapted for confined spaces. Such confined spaces may be for example a vehicle, comprising a sleeper compartment. Among the particular vehicles equipped with a sleeping area are. for instance, the recreational vehicles, flap-top camper trailers, and trucks.

Long-haul drivers need to have dedicated space within their vehicle for resting or sleeping at any time. Although the cab of a truck has limited dimensions, it should provide the necessary comfort to the driver. Among the comfort equipment, the bunk appears as a key element, wherein the driver can sleep, being on a horizontal position, or just rest, without necessary lying down. Adjustable bunks are already known. For instance, U.S. Pat. No. 6,735,797 describes an adjustable bed of a truck sleeper compartment. U.S. Pat. No. 4,989,281 also describes an adjustable bed for trucks. However, the known adjustable beds request dedicated frames, and mechanical systems that increase the weight of the bed and that limit their modularity. Furthermore, bulky systems are space consuming.

It is desirable to provide a bunk that is light, easy to use, while still providing a tunable adjustment of the backrest position.

In a first aspect, the present invention provides a bunk comprising at least a first segment having a front end, pivotally connected to a second segment, by the means of a supple connection, wherein the first segment may be in a horizontal position or in a non-horizontal position, while the second segment remains in a horizontal position. The first segment of the present bunk is suspendable on a support placed above the bunk. Preferably it is suspended at its front end. Furthermore, the inclination angle of the first segment is tunable between a first position and a last position. Preferably, the inclination angle of the first segment is continuously tunable. The supple connection allows to compensate the length of the first segment in correlation with its inclination angle.

In a second aspect, the present invention provides a bunk having an improved modularity. The bunk may adopt a horizontal position, also useful as a sleeping position, and several non-horizontal positions, also useful as tunable resting positions. Also, the base of the bunk can be folded, raised against a wall of the sleeping compartment, or removed. By this way, space can be easily liberated, if necessary, or storage area located under the bunk can be acceded.

In a third aspect, the present invention provides a method for continuously adjusting the backrest inclination of an adjustable bunk.

The bunk of the present invention is characterized by a first and a second segment that are connected to each other through a stipple connection. The supple connection allows the first segment to take at least one inclined position, while the second segment to which the first segment is connected, remains horizontal. Also, the supple connection allows to modulate the length of the first segment in correlation with its inclination angle, in such a way that the total length of the bunk remains constant. The total length of the bunk is meant for the combination of the length of the first segment, the length of the second segment and the length of the supple connection.

The first segment of the bunk provides a backrest, the inclination of which is tunable. Preferably, the inclination adjustment of the backrest is continuously tunable, meaning that any angular position of the backrest, compared to the horizontal position, between an initial position and a terminal position, can be selected without being necessary predefined. The adjustable backrest can be either horizontal or in an inclined position. The inclined position is obtained by the means of at least one suspending element that allows maintaining the front end of the inclined portion of the bunk at an elevated position while the opposite end of the first segment remains connected to the second segment, which stays horizontal and at a lower position. Thus, the inclined portion of the bunk offers a tunable backrest to the user. The suspending element allows suspending the first segment to a support placed above the bunk. The suspending element advantageously provides the possibility for the first segment to be either linked to the upper support, or disconnected from the upper support. The first segment is preferably disconnected from the upper support when it is at the sleeping position, meaning that it is at a horizontal position. The first segment is connected to the upper support when it is at an inclined position. The upper support may be any means that allows the suspension of the first segment of the bunk. Preferably, the upper support allows the suspending element having several positions within the longitudinal axis of the bunk. In other words, the positions wherein the suspending element can fee connected to the upper support are disposed from a first position above the extremity of the bunk, up to a last position above the bunk, closer to the middle of the bunk. This allows the user to select one or the other position of the suspending element along a longitudinal axis depending on the desired angle of the inclined portion. When the inclined portion is suspended to the upper support at the first position, then the inclination angle of the backrest is minimal, still being different from 0. When the inclined portion is suspended to the upper support at the last position, the inclination angle is maximal. The maximal inclination may be for instance the vertical position of the backrest, meaning that the backrest forms a straight angle with the basis of the bunk, which remains horizontal. The positions provided on the upper support wherein the suspending element, or the suspending elements is/are fastened, or hanged, may be separated and predefined positions, providing a limited number of possible inclinations of the backrest. For example, a number between 3 and 30 positions may be selected. Preferably, the positions provided on the upper support, wherein the suspending element, or the suspending elements is/are fastened, or hanged, allow a continuous adjustment of the backrest inclination from a first position to a last position. A continuous adjustment means that no discrete positions are predetermined on the upper support. This would oblige the user to select only a predefined number of positions. Rather, the continuous adjustment, allows the user to select any position he wishes from a first position to a terminal position without any limitation. Such a continuous adjustment may be obtained by the means of one or several sliding elements, adapted to have any position along a continuous sliding displacement.

The at least one sliding element of the present bunk may be integrated to one of the other elements of the bunk, like the upper support or the suspending element or suspending elements. As an example, when the suspending element is a strap, said strap may be adapted to slide within a clasp, in order to allow a continuous adjustment of the length of the strap. In this specific configuration, the clasp is considered as a sliding element. Thus the suspending element comprises the sliding element, and allows a continuous adjustment of the bunk inclination. More particularly, the adjustable backrest is suspended with the strap to a determined position provided on the upper support, and the strap may be adjusted in a continuous way by sliding in a loop around a clasp, providing the opportunity to fine tune the inclination angle of the backrest.

Alternatively, the at least one sliding element may be a separate element that allows the continuous adjustment of the backrest. In such a configuration, the adjustable backrest may be fastened, or hanged, to a separate sliding element that continuously slides between a first position and a last position. Such a sliding element may be for instance a transversal bar which slides along one or more longitudinal rail from a first position, above the extremity of the bunk, up to a last position closer the middle of the bunk. The transversal bar mentioned hereby is meant for any cross-bar or rod slidable from a first position to a last position provided on the upper support.

Above and below, the sliding element is meant for an element which is reversibly slidable in one direction or the other one. In any cases, the sliding element of the present bunk is adapted to allow an easy tuning of the backrest inclination by the means of its sliding properties.

The present bunk further comprises a means of locking the position of the first segment at a given inclination. In case the suspending element is a strap, the locking effect may be obtained by tightening the strap within a clasp. In case the sliding element is a transversal bar adapted to slide along one or several longitudinal rails, the locking effect may be obtained by the means of one or more cams which can be jammed into the rails. The jam of a cam is easily performed by rotating the cam within the rail.

The bunk of the present invention further comprises a means for adapting the length of the inclined portion, which constitutes the backrest, in correlation with its inclination angle. The length of the inclined portion varies depending on the angular position of the backrest. In particular, the length of the inclined portion is minimal when said inclined portion is at a maximum angle, for instance around a vertical position. On the contrary, the length of the inclined portion is maximal when the inclination angle with regard to its horizontal position is minimal. That is to say that when the suspending element is fixed at the first position of the upper support, above the extremity of the bunk, the inclined portion has a maximal length.

In a particular embodiment, the length variation due to the change of inclination of the backrest may be compensated with an adjustment of the suspending element or the sliding element. In case the sliding element is a strap, sliding within a clasp, then the length of the strap itself can be adjusted with respect of the inclination angle of the backrest. More particularly, the length of the strap between the backrest and the upper support where the backrest is suspended varies according to the distance which separates the upper support and the front end of the backrest. Alternatively, one or several rigid supports may be provided behind the backrest, which are adapted to join the upper support at any inclination angle of the backrest. Such a rigid support may comprise for example a telescopic part, like a first tube fastened to the back side of the backrest, wherein a bar or a second tube is included in such a way that said bar or second tube can slide within the first tube, and wherein said bar or second tube is linked to the upper support. Thus, the sliding of the second tube inside the first tube provides a telescopic support the length of which is adjusted according to the inclination angle of the backrest.

In a preferred embodiment, the length variation due to the inclination of the first segment is compensated by the means of a supple connection between the first segment and the second segment of the bunk. Said supple connection allows to compensate the increase of length of the inclined backrest with adjacent part of the horizontal portion of the bunk, in such a way that the total length of the bunk remains unchanged. Therefore, the position of the folding line between the first segment and the second segment of the bunk is allowed to move toward the head front of the bunk or toward the foot extremity of the bunk, in correspondence with the inclination angle of the first segment. At low inclination, when the angle between the first segment and the basis of the bunk is low compared to its horizontal position, the folding line of the supple connection moves toward the foot extremity of the bunk. Under such conditions, the supple connection arises in the continuity of the backrest, thus forming supplement material for the backrest, allowing to compensate the increase of length. On the contrary, when the backrest reaches its maximal inclination angle, the folding line of the supple connection moves toward the head front of the bunk. Under these conditions, the supple connection remains horizontal, in the continuity of the second segment.

Therefore, the present invention is directed to an adjustable bunk comprising a first inclinable segment pivotally connected to a second segment, a upper support, and at least one suspending element, characterized in that the first inclinable segment is suspended to the upper support, while the second segment remains horizontal, and in that the first inclinable segment is connected to the second segment through a non-extendable supple connection.

In another embodiment, the present bunk further comprises at least one sliding element, allowing a continuous adjustment of the angle of inclination of the inclinable segment.

The present invention also provides a method for continuously adjusting the backrest inclination of an adjustable bunk. Said method comprises the step of suspending the first segment of the bunk to an upper support by the means of one or several suspending elements. Any suspending means may be used. However, the most preferred suspending elements may be chosen among features which are easy to place on the upper support and easy to remove.

Therefore, the suspending elements should preferably be manipulated manually and without undue efforts. Examples of suspending elements are hooks, which can be placed on a bar, or inserted in a hole of a structural support. Alternatively, a strap which makes a loop around a structural support can also be used as a suspending element.

The method of the present invention further comprises a step of tuning the angle of inclination of the first segment. The tuning may be performed by selecting one of several different positions on the upper support, said positions being adapted to receive the suspending element or the suspending elements of the bunk. Preferably, the tuning of the first segment inclination is continuous and realized by the means of a sliding element. The sliding element may be part of the suspending element or can be the suspending element itself, or may be a separate sliding element. For instance a sliding element may comprise a strap forming a loop around or within a clasp, such strap being able to slide into said clasp. Alternatively, the sliding element may be a transversal bar sliding into at least one rail, preferably between two rails, disposed longitudinally above the bunk.

The method of the present invention further comprises a step of locking the first segment at a given inclination. As the step of tuning the inclination angle, the step of locking is preferably performed manually and without undue effort. Most preferably, the locking is performed in one movement, which can be for example the tightening of the sliding element on the support. In case the sliding element is a strap, then the locking step is easily performed by the means of tightening the strap within a clasp. In case the sliding element is a transversal bar sliding into at least one rail, the locking step may consist in or comprise clamping the bar into the rails in such a way to prevent its sliding. Such a clamping may be performed for instance by the means of one or more cams, fixed to the transversal bar, which can be jammed into the rail by rotating the transversal bar along its longitudinal axis. A manual rotation of the bar is thus enough for locking the bar onto the support.

In a preferred embodiment, the locking step may be performed by default. This means that a separate manual step of tightening the sliding element is not necessary for the first segment to be locked at a given inclination angle. In particular, it may be enough that the user leans on the first segment, forming the backrest, for inducing the locking. This has the advantage that in case the first segment is not locked beforehand, then the user may still use it without risk of sliding or falling down. The weight of the user against the first segment provides the necessary effort to lock the sliding element at the given position. For instance, when the sliding element is a strap, the tightening of said strap may be done either manually by pulling one side of the strap around the clasp, or the tightening may be automatically performed when the first segment, together with the user, exerts an effort on the other side of the strap, said other side of the strap being the portion of the strap between the first segment and the clasp. In case the sliding element is a transversal bar sliding into a rail, then the locking means is oriented in such a way that it will automatically jam into the rail when the user exerts an effort on the first segment. It has to be noted that the locking is easily reversed, even though it is automatically performed.

The present method may further comprise the step of unlocking a given position to select another position, or to release the first segment from its inclined position toward its horizontal position. The unlocking step is performed manually, through a simple move. In case the locking effect is produced by the tightening of a strap, it is still easy to unlock by releasing the strap from the clasp. In case the locking effect is due to a cam jammed in a sliding rail, then it suffices turning the cam back to its sliding position to unlock the position. This can be made for example by simply manually turning the transversal bar on which is linked the cam or the cams.

The present invention also provides the concomitant use of at least one suspending element, an upper support having several positions, and a supple connection, as described above. Said suspending element, and said supple connection are adapted to interact with each other to allow the adjustment of the backrest of an adjustable bunk having a first inclinable segment and a second segment, which remains horizontal. The above elements interact with each other means, that the position of each one of these elements is correlated to the position of the others, and that all of these elements participate together to the tuning of the backrest inclination. Therefore, the present invention is also directed to the use of a suspending element, an upper support, and a supple connection together for tuning the backrest inclination of an adjustable bunk, wherein a first segment of the bunk is inclinable while a second segment remains horizontal, and wherein the length of the first segment varies in correlation with its inclination angle in such a way that the total length of the bunk remains unchanged.

In one aspect, the adjusting means used for adjusting the position of the backrest is light and easily implemented with the equipment already on board. Said adjusting means includes the suspending element, the supple connection above-mentioned, and the upper support. Said adjusting means may further comprise one or several sliding elements. The upper support on which is suspended the first segment of the bunk may be the structure of an upper bunk or the part of another equipment, like cupboard or storage equipment, already present within the vehicle. Thus, the backrest adjustment does not necessary require a dedicated structure, like specific frames or structural supports, and requires a minimum of additional weight and space, compared to a non-adjustable bunk. Most preferably, the adjustable bunk is not heavier than a corresponding non-adjustable bunk.

In another aspect, the bunk of the present invention allows an improved modularity. The bunk of the present invention is flat and free from bulky systems. The space under the bunk can thus be used as a storage compartment, or for any other equipment useful for camping. To such extend, the present bunk can for instance be raised through one of its longitudinal axis in order to allow access to the compartment below the bunk. For instance, a hinge may be provided to one longitudinal side of the bunk, in such a way that the other longitudinal side can be easily raised. Alternatively, the space under the bunk can be kept free. The present bunk being light, it is easily foldable against a wall of the vehicle in case more space is required within the vehicle. Thus, the bunk of the present invention allows an optimized modularity, while keeping a high level of comfort.

The present invention includes any vehicle equipped with the bunk hereby described, or one of its elements, like one or several upper supports adapted to receive a transversal bar provided with cams. Such vehicle can be a car, a trailer, or a truck. Vehicle is also meant for any other movable constructions like a boat, a train or a plane.

The present invention is now further detailed in correlation to the drawings.

BRIEF DESCRIPTION OF THE DRAWINGS

FIG. 4: comprising

DETAILED DESCRIPTION

Figure 1:
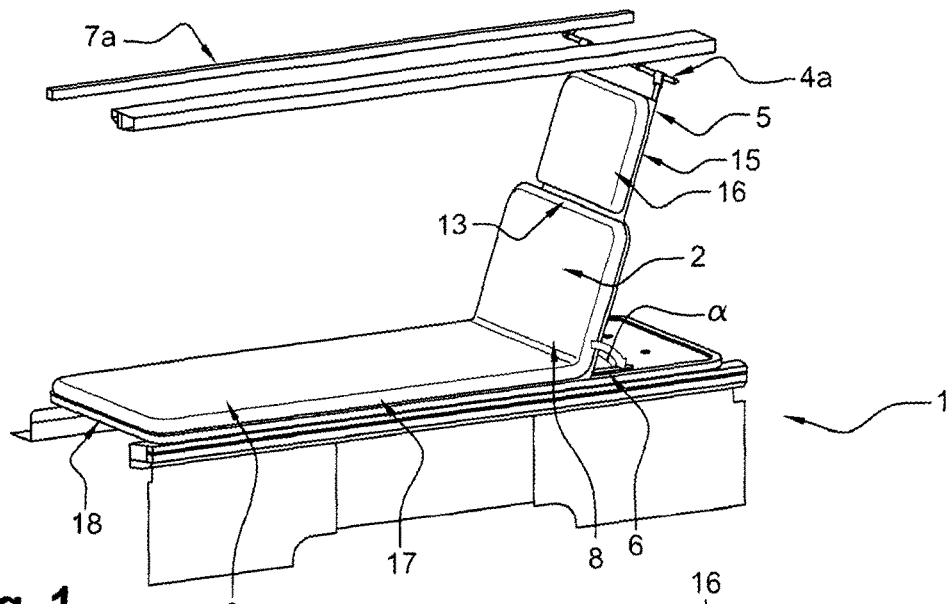
FIG. 1: Example of an adjustable bunk wherein the backrest is at an intermediate inclined position.

Above and below, the backrest is meant for the first segment, which also denotes the inclined portion, or the adjustable part of the bunk.

The supple connection is meant for a feature allowing joining the first and the second segments of the bunk in a flexible and non-extensible manner.

The sleeping position is meant for the horizontal position of the first segment of the bunk, in such a way that it forms together with the second segment of the bunk a flat area.

The bunk (1) of the present invention comprises a first segment (2) pivotally connected to a second segment (3), and a means for suspending the first segment (2) to an upper support (7a, 7b) at its front end (13), while still being connected to the second segment (3) by the means of a supple connection (8). The suspension of the first segment (2) at its front end (13) provides an inclination with regards to the second segment (3), thus providing an adjusted inclination of the first segment (2).

Figure 5:
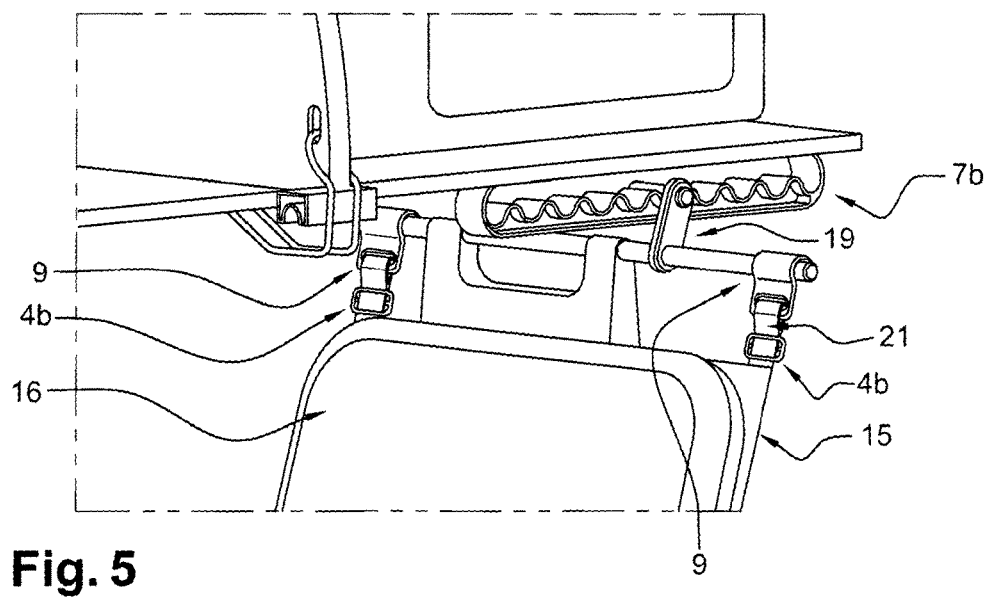
FIG. 5: Details of an alternative suspending element.

Said first segment (2) may be suspended onto an upper support (7a, 7b) through at least one suspending element (5), in such a way that the front end (13) of the first segment (2) is elevated with respect, to the second segment (3). A suspending element (5) according to the invention may be for example a strap (21). Said strap (21) may be connected to the front end (13) of the first segment. It may comprise a hook (9) that allows hanging the first segment (2) on the upper support (7a, 7b). or on another element which is in connection with the upper support (7a, 7b). In a preferred embodiment, the upper support (7a, 7b) is part of the equipment already present in the vehicle. The upper support (7a, 7b) may be for example the basis of an upper bunk, or a structure of cupboard or shelves. The upper support (7a, 7b) may comprise at least one horizontal guide or rail (7a) placed above the bunk (1) and along its longitudinal axis. More preferably, the rails (7a) are two parallel guides disposed above the bunk along its longitudinal axis. Alternatively, the upper support may comprise a ribbed bar (7b), as shown in FIG. 5.

The bunk (1) may further comprise one or several sliding elements (4a, 4b). A sliding element according to the invention is an element which allows a continuous sliding in order to continuously adjust the bunk. As an example, the sliding element may be a transversal bar (4a) adapted to slide within the rails (7a). Alternatively, the sliding element may be the clasp (4b), which allows the strap (21) to slide in it.

The bunk (1) further comprises a locking system (14a, 14b). The aim of the locking system (14a, 14b) is to prevent the sliding of the sliding element (4a, 4b). In case the sliding element is a transversal bar (4a), the locking system may be a earn (14a), fixed on the transversal bar 14a). When the sliding element is the clasp (4b), the locking system is the clasp itself, having a position adapted to let sliding the strap (21) and a second position which prevents the strap (21) from sliding.

Figure 3:
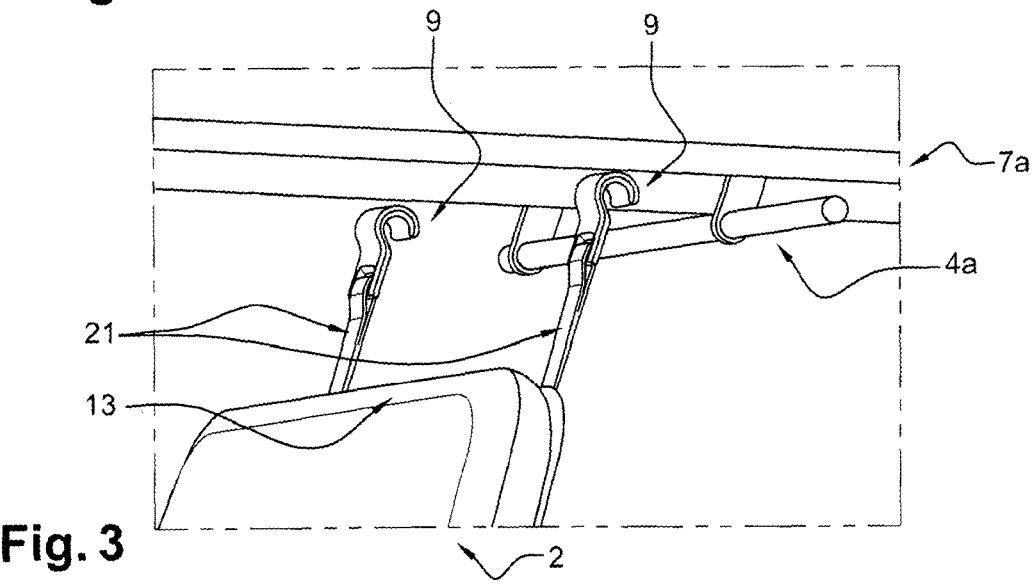
FIG. 3: Enlarge view of the suspending means used in the bunk of FIG. 1.

FIGS. 1 and 3 provide an example where the suspending element (5) is hanged on the rails (7a) through a transversal bar (4a). However, it is possible that the suspending elements (5) are directly connected to the upper support (7a, 7b). The transversal bar (4a) can slide along the two parallel rails (7a).

The first (2) and the second (3) segments form together an angle that allows the user to rest on a non-horizontal position. In other words, the first segment (2) forms an angle (a) with its horizontal position. The first (2) and second (3) segments are linked together through a flexible material which tonus a supple connection (8). Said supple connection (8) provides a folding line between the first segment (2) and the second segment (3). The first (2) and the second (3) segments are thus pivotally connected.

The first (2) and the second (3) segments may be plates made with a rigid material. For instance, the first (2) and second (3) segments may be each made in wood, or plastic, polymer, or any other material, which is light and rigid. Alternatively, the first (2) and/or the second (3) segments are provided with free spaces, like holes or grooves, to be as light as possible while remaining rigid. Preferably, the first (2) and second (3) segments comprise free spaces to allow the air circulating under the bunk (1), thus avoiding condensation or humidity phenomenon. In another embodiment, the first (2) and the second (3) segments are non-rigid and flexible. Preferably, the first (2) and second (3) segments are both made with a fabric. A fabric is lighter than rigid plates, and is even easier fold and store. The first (2) and second (3) segments are advantageously recovered by a soft material, like a mattress (17), which improves the comfort of the user.

In the example shown in FIGS. 1 to 4, the suspending element (5) is determined by two straps (21) each provided with a hook (9), adapted to be hanged onto the transversal bar (4a), which serves as a sliding element. Alternatively, said suspending elements (5) may be directly hanged to an upper support (7a, 7b), without the intermediate of a sliding element (4a). The rails (7a) are horizontal and placed upper the bunk (1), and disposed along the longitudinal axis of the bunk (1). The cross-bar or transversal bar (4a), on which is suspended the front end (13) of the first segment (2), can slide along the rails (7a), The sliding of the cross bar (4a) within the rails (7a) allows the user to determine an inclination angle of the first segment (2) among a continuum of positions between a first position and a last position. The inclination of the first segment (2) can vary with regard to the second segment (3) thanks to the supple connection (8), provided across the full width of the bunk (1), and representing a folding element The position of the folding line, within the supple connection (8) depends on the inclination angle a of the first segment (2). More particularly, the length (1) of the first segment (2), determined between the folding line within the supple connection (8) and the front end (13) of the first segment (2), varies with regard to the inclination angle a of the first segment (2). The supple connection (8) allows the flexibility along a certain distance between the two segments (2) and (3), thus providing a folding surface, wherein the folding can occur at various positions between the first (2) and the second (3) segment of the bunk (1). The length of the supple connection (8) is comprised between around 5 cm and 50 cm, more preferably around 10 cm and around 30 cm, most preferably around 15 cm and 25 cm. The supple connection (8) is preferably made on a non-extendable material such, as a supple polymer, or a fabric, or an assembly of transversal blades adapted to rotate one with respect to the other one. The second segment (3) is preferably fixed on the basis (6) of the bunk. Any fixation means can be used to fix the second segment (3) on the basis (6) of the bunk (1). However, in order to optimize the modularity of the bunk (1), the preferred fixation means will be those which allow manual operations either to fix the segment (3) or to remove it from the basis (6). For instance, clips, zips, scratches, snap buttons or any equivalent means may be used. The fixation means may be provided along the full length of the second segment (3) or only on specific areas. Preferably the fixation means are scratches. More preferably said scratches are placed at least under the supple connection (8), in such a way that the second segment (3) remains flat and horizontal near the folding line. The basis (6) is a rigid basis. It can be a plate made with a rigid, and still light, material, such as wood or polymer. Such material may be either plain or it can be provided with alveolus, in order to reduce the weight while keeping the necessary rigidity. Alternatively, the basis (6) may comprise free spaces like holes or grooves, or can be even constituted with separate blades or plates, in such a way that it is as light as possible while keeping the necessary rigidity. In a preferred embodiment, the basis (6) comprises free spaces to allow the air circulating under the first segment (2), and also the second (3) segment when the bunk (1) is placed on a sleeping position.

Figure 2:
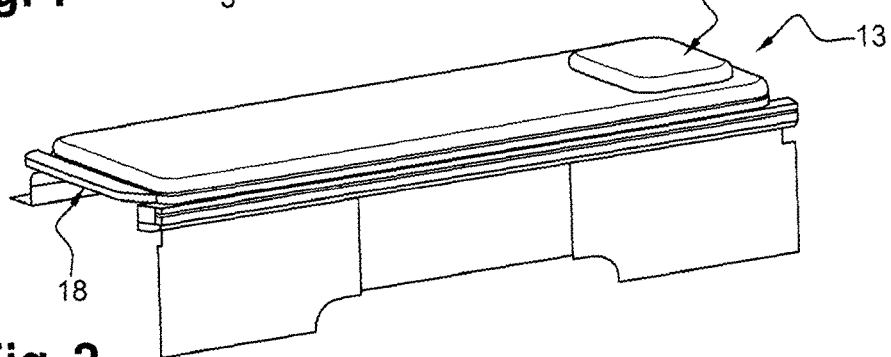
FIG. 2: Example of an adjustable bunk in a sleeping position.

On FIG. 2, the bunk is represented on a sleeping position, wherein the first segment (2) is on the horizontal position, in the continuity of the second segment (3). In this position, the first segment (2) is preferably disconnected from the upper support (7a, 7b).

Figure 4A:
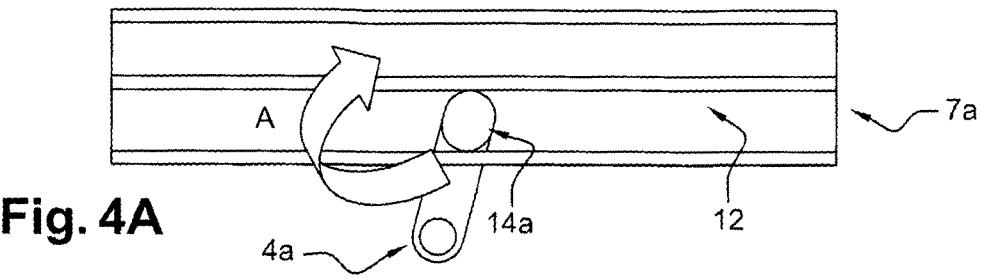
FIG. 4A, 4B and 4C: Details of the sliding and locking system used in the hunk of FIG. 1 to 3.
Figure 4B:
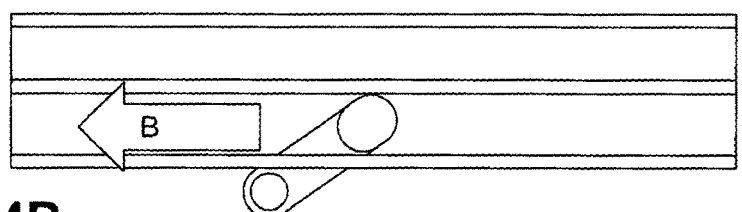
Figure 4C:
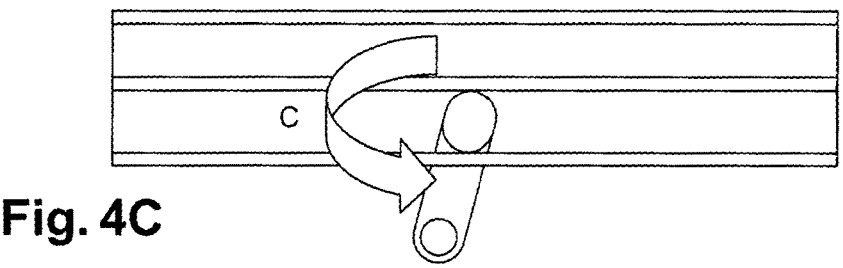

The sliding element (4a, 4b) may be equipped with a locking element (14a, 14b). FIGS. 4 A, 4B and 4C provide an example wherein the sliding element is a transversal bar (4a) and wherein the locking element is a cam (14a) fixed on the transversal bar (4a), and included within a longitudinal groove (12) of the rails (7a). The cam (14a) can be on a locked position (FIG. 4A), preventing the sliding of the transversal bar (4a), or in an open position (FIG. 4B), allowing the transversal bar (4a) to slide from one position to another one along the rails (7a). The locking position is obtained by rotating the cam (14a) in such a way that it jams within the groove (12) of the rails (7a), thus blocking the transversal bar (4a) at a given position. The cam (14a) is characterized by having a first diameter larger than the groove (12) of the rails (7a) in which it is inserted, and a smaller diameter smaller than the groove (12) of the rails (7a). The smaller diameter allows the cam (14a) sliding within the groove (12) of the rails (7a) whereas the larger diameter blocks the cam (14a) into the groove (12). The cam (14a) is oriented in such a way that it comes automatically on the locked position, in case no specific locking action is performed, as shown in FIG. 4C by the arrow C. Unlocking the cam (14a) is performed by rotating it in such a way that the smaller diameter of the cam (14a) fits with the width of the groove (12) of the rails (7a), as shown in FIG. 4A by the arrow A. Then, the sliding of the transversal bar (4a) can be performed either in the direction of B or in the reverse direction, until the cam (14a) is locked again.

FIG. 5 shows an alternative system where the upper support comprises a ribbed bar (7b) provided with pre-defined slots wherein a hook (19) can be engaged. In this particular example, a position can be selected among several discrete positions, each corresponding to a given inclination angle of the backrest (2).

In this example, a continuous adjusting may be performed by the means of one or several clasps (4b) in which the straps (21) are allowed to slide in order to fine tune the inclination angle of the first segment (2). Said clasps (4b) are therefore the sliding elements of the bunk (1). Said clasps (4b) may be in an open position, allowing the straps (21) to slide, or in a closed position, preventing the straps (21) from sliding. Said closed position corresponds to the locking position.

The length of the first (2) and the second (3) segments varies in function of the angular position of the first segment (2), as shown in FIGS. 6, 6A, 6B and 6C.

The distance (Yl) between the folding line, within the supple connection (8) and the extremity (18) of the bunk (1) is determined by the distance ($Y_2$) resulting from the chosen position of the transversal bar (4a) on the rails (7a), and is expressed according to the total length (L) of the bunk (1) and the height (Z) between tire bunk (1) and the rails (7a) according to the following rule:

$$(L - y_1)^2 = (y_2 - y_1)^2 + z^2$$

$$L^2 - 2Ly_1 + y_1^2 = y_2^2 - 2y_1y_2 + y_1^2 + z^2$$

$$L^2 - y_2^2 - z^2 = 2(L - y_2)y_1$$

$$y_1 = \frac{L^2 - y_2^2 - z^2}{2(L - y_2)}$$

Wherein

Yi represents the length of the second segment (3), from the extremity (18) to the folding line of the supple connection (8), $Y_2$ represents the distance between the front end (13) of the first segment and the foot extremity (18) of the bunk (1).

L represents the total length of the bunk at its sleeping position, wherein the first segment (2) is on the horizontal position, and Z represents the height between the basis (6) of the bunk (1) and the upper support (7a, 7b).

The total length (L) of the bunk remains constant with the following value:

$$L = Y_i + l$$

Wherein

L is the total length of the bunk (1),

Yi is the length of the second segment (3), from the extremity (18) to the folding line within the supple connection (8) and l is the length of the first segment (2), from the folding line within the supple connection (8) to the front end (13).

Thus, the inclination angle a, the length l of the first segment (2), and the position of the front end (13) of the first segment (2) on the rails (7a) depend all from one another. Specific examples are provided in the table below.

Figure 6:
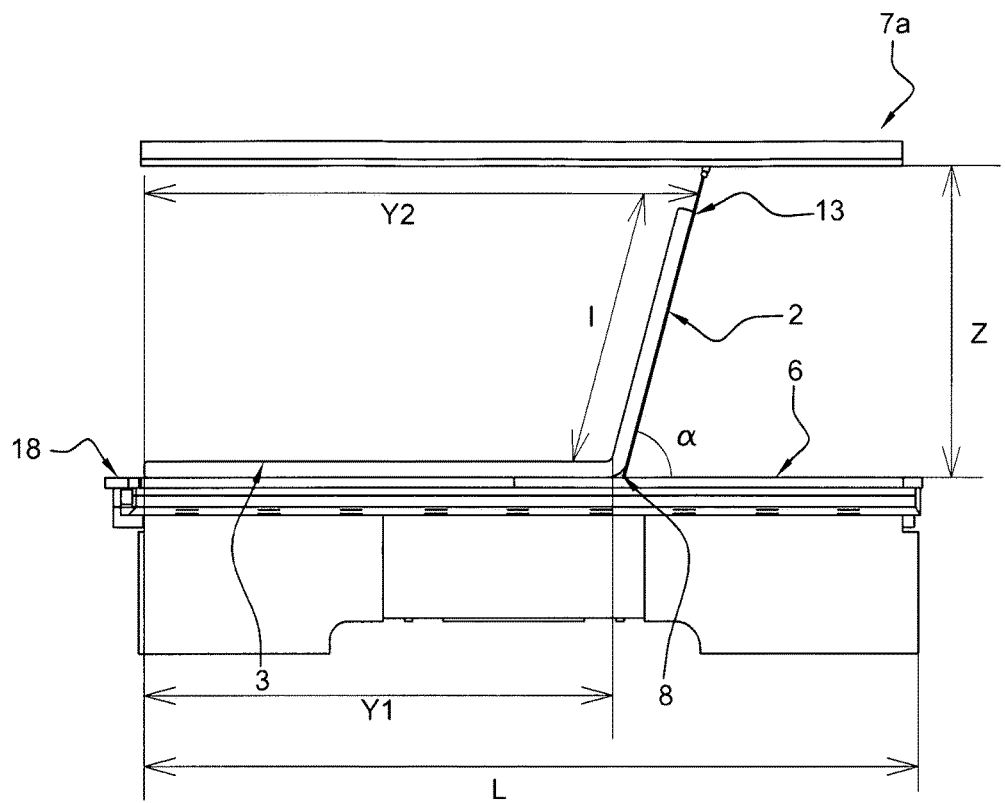
FIG. 6. including 6 A. 6B and 6C: Bunk in several intermediate inclined positions, wherein the length of the first segment (2) varies with regard to its inclination angle.
Figure 6A:
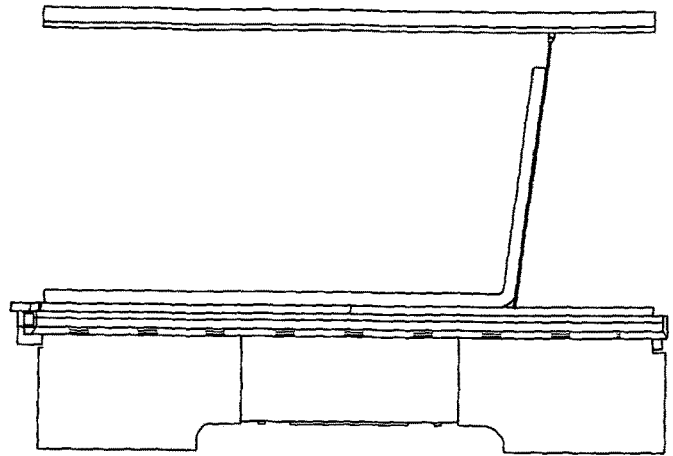
Figure 6B:
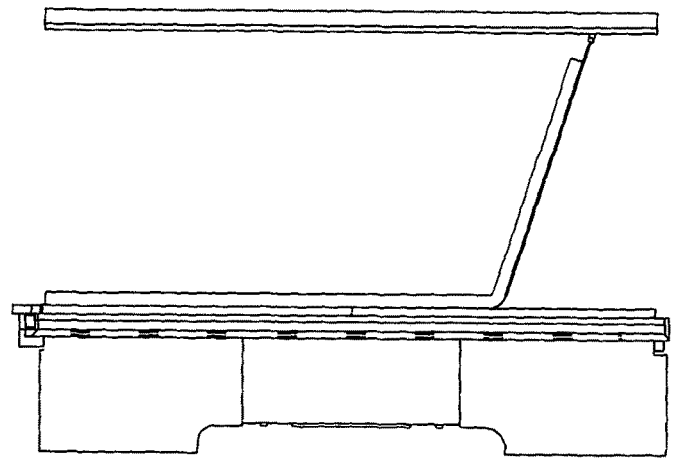
Figure 6C:
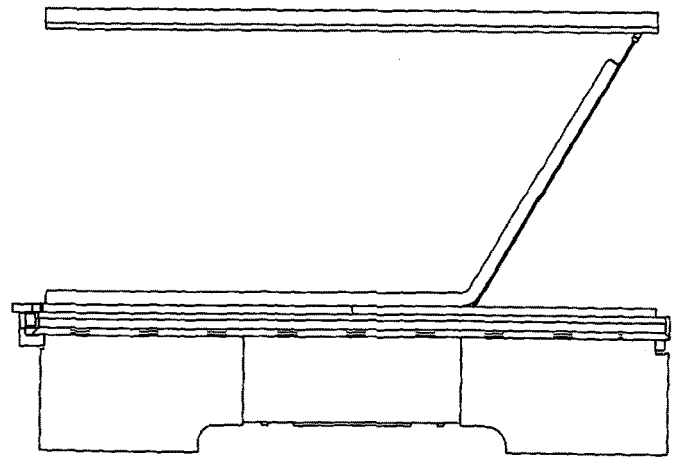

| FIG. | $Y_1$ (mm) | l (mm) | α (deg) |
|---|---|---|---|
| FIG. 6A | 1653 | 938 | 83 |
| FIG. 6B | 1591 | 1000 | 68 |
| FIG. 6C | 1520 | 1071 | 58 |

Figure 7:
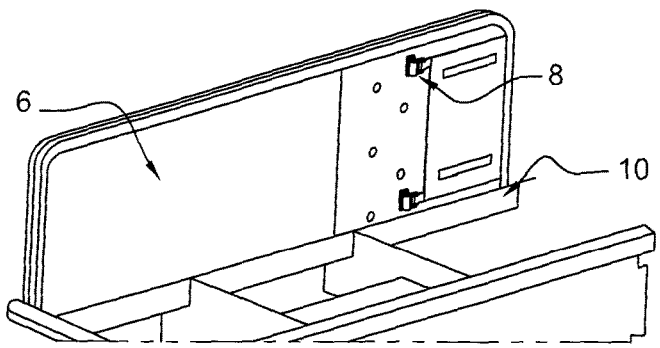
FIG. 7, including 7A and 7B: Bunk in a folded position, comprising a fabric (15) foldable under the basis (6).
Figure 7A:
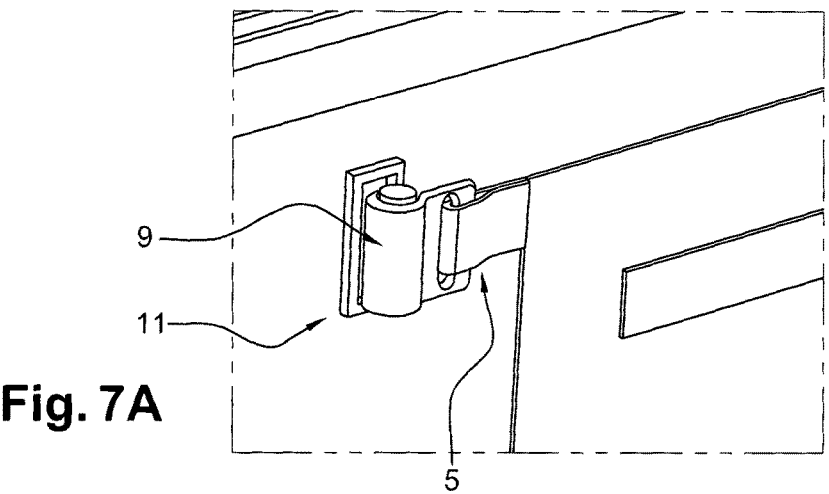
Figure 7B:
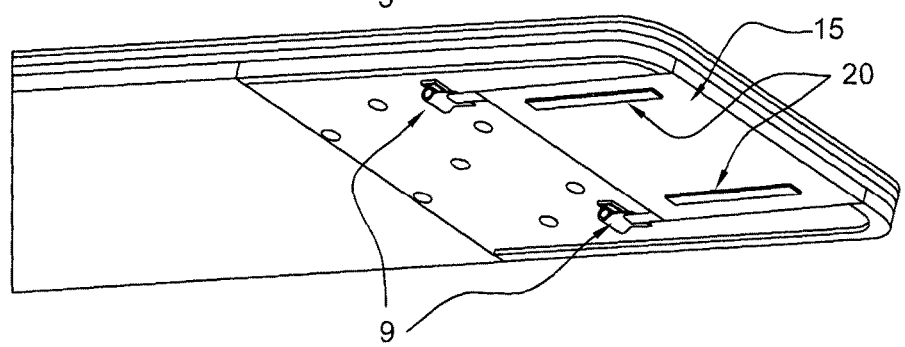
Figure 8:
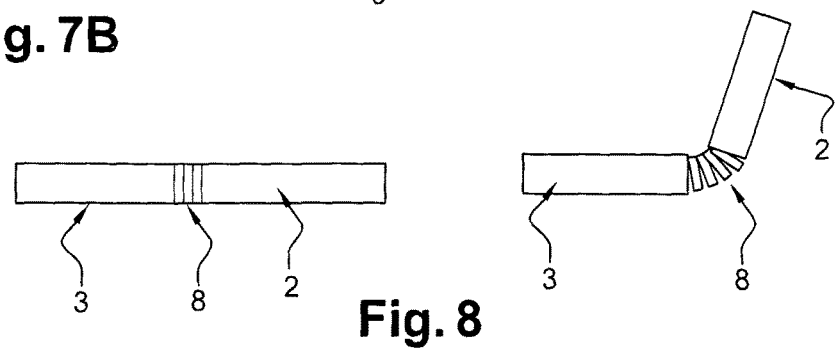
FIG. 8: Example of a supple connection.

In a particular embodiment, the bunk (1) can be folded, as in FIG. 7. Once the first segment (2) of the bunk (1) is on horizontal position and disconnected from the upper support (7a, 7b), then the basis (6) of the bunk (1) can be raised, or removed from its horizontal position.

In a particular embodiment the bunk (1) may be provided with a foldable extension (22). The foldable extension (22) is an additional part that extends upfront from the first segment (2) between the first segment (2) and the upper support (7a, 7b) when the first segment (2) is on a non-horizontal position. The foldable extension (22) can be folded under the bunk (1) when the first segment (2) is on the horizontal position. For example, said foldable extension may be a fabric (15). Said foldable extension (22) provides an additional area where a pillow (16) may be positioned. The pillow (16) may be fixed on the fabric (15) by any usual means like a zip, one or several buttons or snap buttons. Alternatively, scratches (20) may be used. This allows to further increase the length of the bunk (1) when the first segment (2) is at an inclined position. Then, the user disposes from more space. Once the bunk (1) is placed at the sleeping position, the fabric (15) can be folded under the basis (6) of the bunk (1), and fixed by the means of the hooks (9) of the suspending element (5) to the back side (11) of the basis (6).

As mentioned above, the present invention is also directed to a a method of adjusting an adjustable bunk (1) comprising a first segment (2) pivotally connected to a second segment (3) by the means of a supple connection (8) wherein the method comprises the steps of:

a) suspending the front end (13) of said first segment (2) to an upper support (7a, 7b) by the means of a suspending element (5)

b) tuning the inclination angle a of said first segment (2), mid c) locking said first segment (2) at a given inclination angle a by the means of a locking system (14a, 14b).

In said method, the tuning of the inclination angle a may be a continuous tuning, or a continuous adjustment. The continuous adjustment may be for example performed by the means of a sliding element (4a, 4b).

In said method, the step c) may be performed by the mere pressure of the user on said first segment (2). In a specific embodiment, the locking step c) is performed without any additional movable parts. This means that no mechanical part other than those described above intervene for the locking step. By movable parts, it has to be understood any part the status or the position of which can change between the locked position and the unlocked position, like a spring, a pin, or a retractable stud.

In the method, the tuning step e) comprises the adaptation of the length (l) of said first segment (2) and the second segment (3) according to the longitudinal position of the front end (13) of said first segment (2). In particular, the length of the first (2) and second (3) segment is determined as $$(L-y_1)^2 = (y_2-y_1)^2 + z^2$$
$$L^2 - 2Ly_1 + y_1^2 = y_2^2 - 2y_1y_2 + y_1^2 + z^2$$
$$L^2 - y_2^2 - z^2 = 2(L-y_2)y_1$$
$$y_1 = \frac{L^2 - y_2^2 - z^2}{2(L-y_2)}$$

Wherein

Yi represents the length of the second segment (3), from the extremity (18) to the folding line within the supple connection (8), $Y_2$ represents the distance between the position of the sliding element (4a, 4b) on the upper support (7a, 7b) and the foot extremity (18) of the bunk (1).

L represents the total length of the bunk (1) at its sleeping position, wherein the first segment (2) is on the horizontal position.

Z represents the height between the basis (6) of the bunk (1) and the upper support (7a, 7b)

And wherein the total length (L) of the bunk remains constant with the following value:

$$L = Y_i + l$$

Wherein

L is the total length of the bunk (1),

Yi is the length of the second segment (3), and l is the length of the first segment (2), determined between the folding line of the supple connection (8) and the front end (13) of the first segment (2).

The method of the present invention may further comprise an unlocking step, wherein the unlocking is manually performed.

The invention claimed is:

1. A bunk, comprising at least a first segment pivotally connected to a second segment by a supple connection, wherein the first segment is positionable in positions ranging from a horizontal position to a non-horizontal position while the second segment remains in a horizontal position, wherein the first segment is releasably suspendable on an upper support placed above the bunk.

2. The bunk according to claim 1, wherein the non-horizontal position of the first segment is continuously tunable by the means of a sliding element.

3. The bunk according to claim 1, further comprising a locking system.

4. The bunk according to claim 1, wherein the sliding element comprises a slidable transversal bar and wherein the upper support comprises one or more rails each provided with at least one longitudinal groove, wherein the transversal bar can slide and wherein the bunk comprises a locking system that comprises one or more cams fixed on the slidable transversal bar and slidable into the groove of the rails, wherein the cam is adapted to be in a locked position, or in an open position.

5. The bunk according to claim 1, wherein the sliding element comprises one or more clasps, wherein straps can continuously slide, wherein the support is a ribbed bar, and wherein the first segment is connected to the ribbed bar by the means of a hook adapted to fit with the teeth of the ribbed bar.

6. The bunk according to claim 1, wherein the supple connection is a non-extensible connection, in such a way that a total length of the bunk between the first segment and the second segment remains constant at the horizontal position and in non-horizontal positions.

7. The bunk according to claim 1, wherein the supple connection is a folding surface wherein a position of a folding line between the first and the second segments depends on the inclination angle (a) of the first segment.

8. The bunk according to claim 1, wherein the first segment is disconnected from the support when it is in a horizontal position.

9. The bunk according to claim 1, wherein the first and second segments are linked to a common rigid basis, the common rigid basis being completely foldable in a non-horizontal position.

10. The bunk according to claim 9, wherein the first and second segments can be removed from the common rigid basis.

11. The bunk according to claim 1, wherein the bunk further comprises a foldable part extending over the first segment, between the upper support and a front end of the first segment when the first segment is at a non-horizontal position.

12. The bunk according to claim 11, wherein the foldable part can be folded under the bunk when the first segment is on a horizontal position.

13. The bunk according to claim 1, wherein the bunk is placed within a sleeper compartment of a vehicle.

14. An upper support adapted to releasably suspend a bunk, wherein the upper support allows the suspension of the bunk at various positions, the bunk comprising at least a first segment pivotally connected to a second segment by a supple connection, wherein the first segment is positionable in positions ranging from a horizontal position to a non-horizontal position while the second segment remains in a horizontal position, wherein the first segment is releasable suspendable on the upper support placed above the bunk.

15. An upper support adapted to releasably suspend a bunk, wherein the upper support allows the suspension of the bunk at various positions, wherein the upper support is a set of rails provided with a longitudinal groove or a ribbed bar.

16. A vehicle comprising the bunk according to claim 1 and an upper support configured to allow suspension of the bunk at various positions.

17. A method of adjusting a bunk comprising a first segment pivotally connected to a second segment by the means of a supple connection, wherein the method comprises:
   a) suspending the first segment to an upper support by the means of a suspending element,
   b) tuning the inclination angle of the first segment, and
   c) locking the first segment at a given inclination angle a by the means of a locking system.

18. The method according to claim 17 wherein the tuning of the inclination angle is performed by the means of at least one sliding element.

19. The method according to claim 17, wherein the locking step c) is automatically performed by the pressure of the user on the first segment.

* * * * *